(12) United States Patent
Davies et al.

(10) Patent No.: US 7,360,235 B2
(45) Date of Patent: Apr. 15, 2008

(54) SYSTEMS AND METHODS FOR OPERATING A PERIPHERAL RECORD/PLAYBACK DEVICE IN A NETWORKED MULTIMEDIA SYSTEM

(75) Inventors: David B. Davies, Lawrenceville, GA (US); Samuel H. Russ, Lawrenceville, GA (US); Irvan J. Krantzler, Atlanta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 10/437,556

(22) Filed: May 14, 2003

(65) Prior Publication Data

US 2004/0068755 A1     Apr. 8, 2004

Related U.S. Application Data

(63) Continuation-in-part of application No. 10/403,485, filed on Mar. 31, 2003, and a continuation-in-part of application No. 10/342,670, filed on Jan. 15, 2003.

(60) Provisional application No. 60/418,402, filed on Oct. 15, 2002, provisional application No. 60/416,155, filed on Oct. 4, 2002.

(51) Int. Cl.
*H04N 7/173* (2006.01)

(52) U.S. Cl. .......................... 725/133; 725/82; 725/80; 725/153

(58) Field of Classification Search .................. 725/74, 725/78–83, 85, 127, 133, 141, 153; 348/734, 348/552; 340/825.69, 825.72; 398/106, 398/135, 107
See application file for complete search history.

(56) References Cited

U.S. PATENT DOCUMENTS

| 4,290,081 A | 9/1981 | Foerster ......................... 358/4 |
| 4,439,784 A * | 3/1984 | Furukawa et al. ............ 725/25 |

(Continued)

FOREIGN PATENT DOCUMENTS

WO     WO 98/37648     8/1998

(Continued)

OTHER PUBLICATIONS

Scientific-Atlanta, Inc. Pending Patent Application Serial No. 10/008,581, filed Nov. 13, 2001, entitled "Networked Subscriber Television Distribution," Inventors: Samuel H. Russ, David B. Lett, Jonathan A. Robinson, and Michael A. Gaul.

*Primary Examiner*—Ngoc Vu (57) ABSTRACT

Systems and methods are disclosed of a network including a primary device, a plurality of remote devices, and a shared peripheral device. The network allows the remote devices to operate the peripheral device, such as a DVD player, VCR, or camcorder, via the primary device and the network. The peripheral device is typically connected to the primary device and shared among all devices. The network also includes a splitter/isolation module (SIM) that routes the signals between the primary device and the plurality of remote devices.

21 Claims, 8 Drawing Sheets

U.S. PATENT DOCUMENTS

| | | | |
|---|---|---|---|
| 4,540,958 A | 9/1985 | Neyens et al. | 332/16 |
| 4,885,803 A * | 12/1989 | Hermann et al. | 398/112 |
| 4,963,995 A * | 10/1990 | Lang | 386/54 |
| 5,010,299 A | 4/1991 | Nishizawa et al. | 324/209 |
| 5,010,399 A | 4/1991 | Goodman et al. | 358/85 |
| 5,251,074 A | 10/1993 | Hamma et al. | 360/10.1 |
| 5,406,626 A | 4/1995 | Ryan | 380/9 |
| 5,412,416 A | 5/1995 | Nemirofsky | |
| 5,524,051 A | 6/1996 | Ryan | 380/9 |
| 5,590,195 A | 12/1996 | Ryan | 380/9 |
| 5,699,105 A * | 12/1997 | Chen et al. | 725/120 |
| 5,701,383 A | 12/1997 | Russo et al. | 386/46 |
| 5,708,961 A | 1/1998 | Hylton et al. | 455/4.2 |
| 5,714,945 A | 2/1998 | Sakuma et al. | |
| 5,751,806 A | 5/1998 | Ryan | 380/9 |
| 5,787,472 A | 7/1998 | Dan et al. | 711/134 |
| 5,793,413 A | 8/1998 | Hylton et al. | 348/12 |
| 5,808,659 A * | 9/1998 | Coutinho et al. | 725/141 |
| 5,828,403 A | 10/1998 | DeRodeff et al. | 348/7 |
| 5,886,732 A | 3/1999 | Humpleman | 348/10 |
| 5,886,753 A * | 3/1999 | Shinyagaito et al. | 725/59 |
| 5,983,068 A | 11/1999 | Tomich et al. | |
| 6,055,355 A | 4/2000 | Lee | 386/70 |
| 6,091,320 A | 7/2000 | Odinak | 340/310.01 |
| 6,172,712 B1 | 1/2001 | Beard | 348/552 |
| 6,181,784 B1 | 1/2001 | Duran et al. | 379/93.21 |
| 6,215,526 B1 | 4/2001 | Barton et al. | 348/473 |
| 6,219,839 B1 * | 4/2001 | Sampsell | 725/40 |
| 6,233,389 B1 | 5/2001 | Barton et al. | 386/46 |
| 6,285,746 B1 | 9/2001 | Duran et al. | 379/93.21 |
| 6,310,886 B1 | 10/2001 | Barton | 370/462 |
| 6,317,884 B1 | 11/2001 | Eames et al. | 725/78 |
| 6,324,338 B1 | 11/2001 | Wood et al. | 386/83 |
| 6,327,418 B1 | 12/2001 | Barton | 386/46 |
| 6,330,334 B1 | 12/2001 | Ryan | 380/237 |
| 6,452,923 B1 | 9/2002 | Gerszberg et al. | |
| 6,481,013 B1 | 11/2002 | Dinwiddie et al. | |
| 6,493,875 B1 | 12/2002 | Eames et al. | |
| 6,526,581 B1 | 2/2003 | Edson | 725/74 |
| 6,530,085 B1 * | 3/2003 | Perlman | 725/82 |
| 6,588,017 B1 * | 7/2003 | Calderone | 725/120 |
| 6,622,304 B1 | 9/2003 | Carhart | |
| 6,757,906 B1 | 6/2004 | Look et al. | |
| 6,791,995 B1 | 9/2004 | Azenkot et al. | |
| 6,870,570 B1 * | 3/2005 | Bowser | 348/552 |
| 2001/0005906 A1 | 6/2001 | Humpleman | |
| 2001/0039660 A1 * | 11/2001 | Vasilevsky et al. | 725/78 |
| 2002/0069417 A1 * | 6/2002 | Kliger et al. | 725/78 |
| 2002/0146237 A1 | 10/2002 | Safadi | 386/94 |
| 2002/0166124 A1 * | 11/2002 | Gurantz et al. | 725/78 |
| 2005/0028208 A1 | 2/2005 | Ellis et al. | |

FOREIGN PATENT DOCUMENTS

WO     WO 00/35201     6/2000

* cited by examiner

SYSTEMS AND METHODS FOR OPERATING A PERIPHERAL RECORD/PLAYBACK DEVICE IN A NETWORKED MULTIMEDIA SYSTEM

CROSS-REFERENCE TO RELATED PATENT APPLICATIONS

The present application claims priority to U.S. provisional application Ser. No. 60/418,402 filed on Oct. 15, 2002. Additionally, the present application is a continuation-in-part of U.S. patent application Ser. No. 10/342,670 filed Jan. 15, 2003, which claims priority to U.S. provisional application Ser. No. 60/416,155 filed Oct. 4, 2002, and a continuation-in-part of U.S. patent application Ser. No. 10/403,485 filed Mar. 31, 2003, which claims priority to U.S. provisional application Ser. No. 60/416,155 filed Oct. 4, 2002. Furthermore, the present application incorporates by reference in its entirety herein copending U.S. patent applications having Ser. Nos. 10/263,160; 10/263,449; and 10/263,270, which were filed on Oct. 2, 2002 and are assigned to a common assignee, the disclosures and teachings of which are hereby incorporated by reference.

FIELD OF THE INVENTION

This invention relates in general to broadband communications systems, and more particularly, to the field and functionality of a networked multimedia system having a plurality of receiving terminals and a networked peripheral device that is suitable for use in the broadband communications system.

DESCRIPTION OF THE RELATED ART

Broadband communications systems, such as satellite and cable television systems, are now capable of providing many services in addition to analog broadcast video. In implementing enhanced programming, the set-top terminal (STT), otherwise known as the set-top box, has become an important computing device for accessing various video services. In addition to supporting traditional analog broadcast video functionality, many STTs now also provide other functionality, such as, for example, an interactive program guide (IPG), video-on-demand (VOD), subscription video-on-demand (SVOD) and functionality traditionally associated with a conventional computer, such as e-mail. Recently new functionality has been added to conventional STTs—namely the ability to record an incoming video stream in digitized form onto a mass storage device, such as a hard disk drive, and play back that recorded video as desired by the user. This functionality has become known as a digital video recorder (DVR) or personal video recorder (PVR) and is viewed as a superior alternative to conventional video tape recorders for capture and subsequent playback of programming content.

An STT is typically connected to a communications network (e.g., a cable or satellite television network) and includes hardware and software necessary to provide various services and functionality. Preferably, some of the software executed by an STT is downloaded and/or updated via the communications network. Each STT also typically includes a processor, communication components, and memory, and is connected to a television or other display device. While many conventional STTs are stand-alone devices that are externally connected to a television, an STT and/or its functionality may be integrated into a television or other device, as will be appreciated by those of ordinary skill in the art.

An STT is typically connected to a television set and located at the home of the cable or satellite system subscriber. Since the STT is located at a subscriber's premises, it typically may be used by two or more users (e.g., household members). Television has become so prevalent in the United States, however, that the typical household may have two or more television sets, each television set requiring its own STT player if the subscriber wishes to have access to enhanced functionality. Additionally, each television set requires its own video cassette recorder (VCR) or digital video disc (DVD) player. However, the STTs and other peripheral devices can be expensive and users may not be willing to purchase additional devices. This is particularly true of STTs incorporating PVR functionality since such devices require not only the addition of a hard disk drive but also additional processing components and software.

Therefore, there exists a need for systems and methods for addressing these and/or other problems associated with STTs and peripheral devices. Specifically, there exists a need for systems and methods that allow multiple users operating discrete STTs within a networked premises or other local area to operate a central unit such as a VCR, DVD player, or other device having recording and playback functions.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENTS

Preferred embodiments of the invention can be understood in the context of a broadband communications system and a local network system. Note, however, that the invention may be embodied in many different forms and should not be construed as limited to the embodiments set forth herein. For example, transmitted broadband signals may include at least one of video/audio, telephony, data, and Internet Protocol (IP) signals, to name but a few. Additionally, receiving devices (i.e., a primary device and a plurality of remote devices) included in a local network system receiving the transmitted broadband signals may include a set-top terminal (STT), a television, a computer, a personal digital assistant (PDA), or other device. Furthermore, a networked peripheral device is explained in the context of a VCR or DVD player, but it is envisioned that the peripheral device can be an advanced record/playback device, such as a digital camcorder or an MP3 player. All examples given herein, therefore, are intended to be non-limiting and are provided in order to help clarify the description of the invention.

The present invention is directed towards a networked multimedia system including a networked peripheral device, such as a record/playback device, that can be shared among a plurality of receiving devices. Briefly, the peripheral device is preferably connected to the primary device and, advantageously, operated from any receiving device in the network. It will be appreciated, however, that the peripheral device can also be connected to any of the remote devices and shared among all receiving devices in the network. Accordingly, a user only needs to purchase one main peripheral device that can be operated from each receiving device in the network as if the peripheral device is collocated with each receiving device.

A networked multimedia system (NMS) is described in copending U.S. patent application Ser. No. 10/342,670, filed Jan. 15, 2003, the disclosure and teachings of which are hereby incorporated by reference. As taught therein, the NMS is typically located within a subscriber's premises. It will be appreciated, however, that the NMS can also be used in a multi-unit dwelling, business, school, hotel, or hospital, among others. Advantageously, the NMS allows a plurality of receiving devices in the premises to be locally networked (i.e., home-networked). One of the receiving devices typically acts as the server or primary device (i.e., the primary set-top terminal (STT)). The primary STT receives and forwards upon request broadband multimedia presentations (e.g., analog or digital television channels (i.e., audio/video signals), IP signals, video-on-demand (VOD) signals, administrative signals, etc.) throughout the local network to the plurality of remote devices (i.e., client devices). Furthermore, the remote devices may each request of and seamlessly receive from the primary STT resident presentations (e.g., a stored or recorded presentation, or the interactive program guide) and/or request access to a peripheral device (e.g., a VCR or DVD player) that may be connected to the primary STT or, alternatively, to any one of the remote devices, for example. Additionally, the remote devices may independently receive presentations from and send upstream signals to the communications network. Accordingly, the remote devices may be simplified, less-costly versions of the primary STT but are capable of utilizing, via the NMS, some or all of the advanced hardware and software features, such as memory, a mass storage device, software applications, or infrastructure for transmitting signals to coupled devices and the headend, that are available in the primary STT.

An Example of a Broadband Communications System

Figure 1:
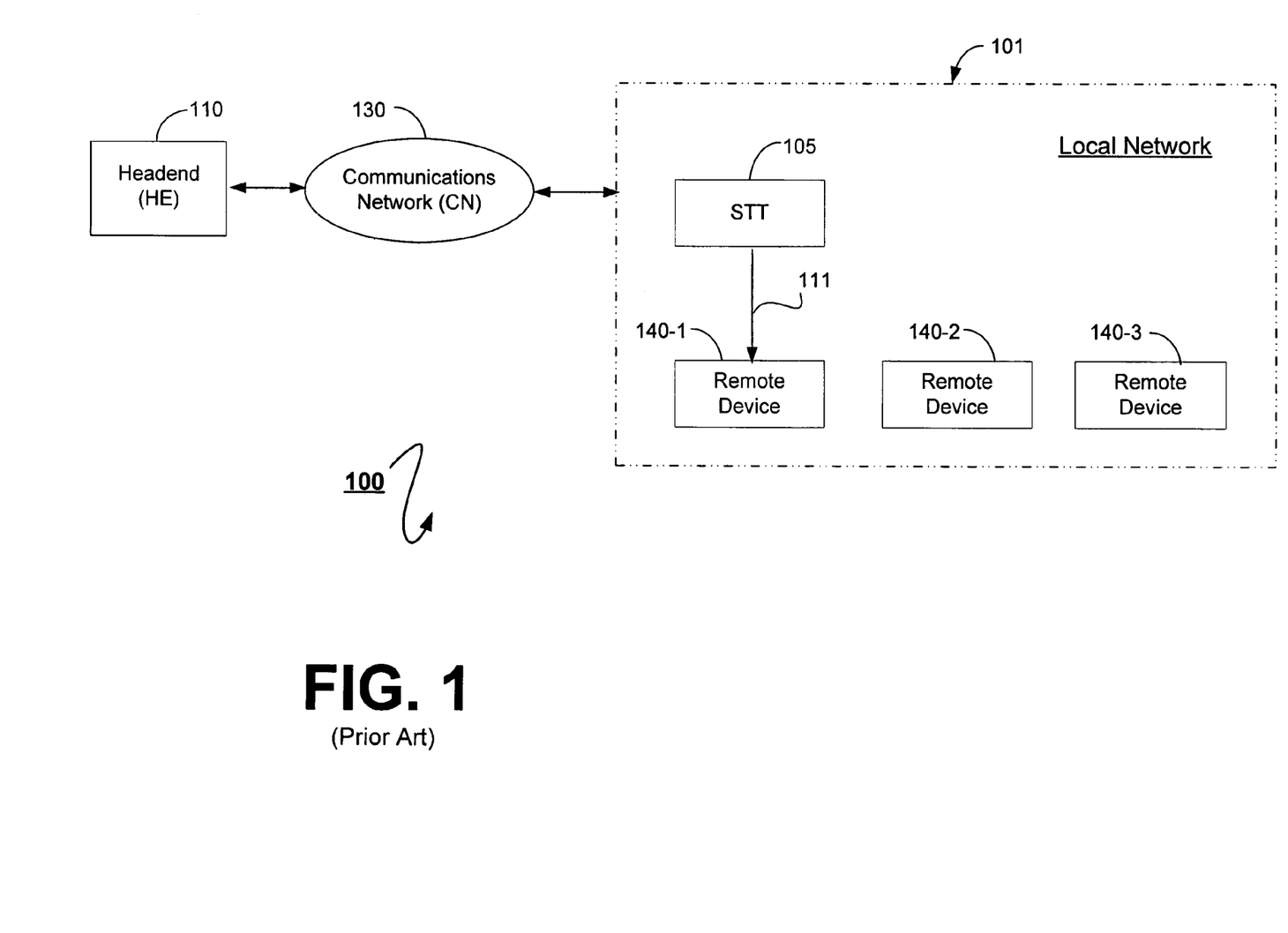
FIG. 1 is a simplified block diagram depicting a non-limiting example of a conventional broadband communications system.

FIG. 1 is a simplified block diagram depicting a non-limiting example of a conventional broadband communications system 100. In this example, the communications system 100 includes a headend 110 that is coupled to a local network (LN) 101 via a communications network (CN) 130. The CN 130 may be any network that is suitable for carrying, preferably downstream and upstream, broadband multimedia signals, such as audio/video signals, IP signals, telephony signals, or data signals to name but a few. The CN 130 may be, for example, a hybrid fiber/coax (HFC) network, a fiber-to-the-home (FTTH) network, a satellite network, or a fixed wireless network (e.g., MMDS), among others.

The headend 110 may include one or more server devices (not shown) for providing broadband signals, such as video, audio, and/or data signals, to the STT 105 via the CN 130. The headend 110 and the STT 105 cooperate to provide a user with a variety of services. The services may include, for example, analog or digital broadcast television services and channels, video-on-demand (VOD) services, and/or pay-per-view (PPV) services, among others. Each broadcast television channel typically provides a sequence of television presentations corresponding to a television station (e.g., ABC, NBC, CBS, or FNN, to name a few) and is typically identified by a channel number (e.g., channel 2, channel 3, channel 4, etc.) that is available to a user at all times. Additionally, PPV services are typically transmitted to the STT 105 at all times, but can only be viewed on the STT 105 as provisioned. On the other hand, the STT 105 typically requests a VOD service and, in response, the headend 110 transmits the presentation downstream to the STT 105.

The LN 101 includes a set-top terminal (STT) 105 that provides the broadband signals to remote devices 140-1 and 140-2, and, optionally, to additional remote devices including, for example, remote device 140-3. The STT 105 may be coupled to the remote devices either directly or via one or more other devices. It will be appreciated that the STT 105 may be a stand-alone unit or may be integrated into another device, such as, for example, a television or a computer. Additionally, the remote devices may be located in different rooms than where the STT 105 is located. Further information regarding the LN 101 is provided in copending U.S. patent application Ser. Nos. 10/263,160; 10/263,270; and 10/263,449, which were filed on Oct. 2, 2002, the disclosure and teachings of which are hereby incorporated in their entirety by reference.

Figure 2:
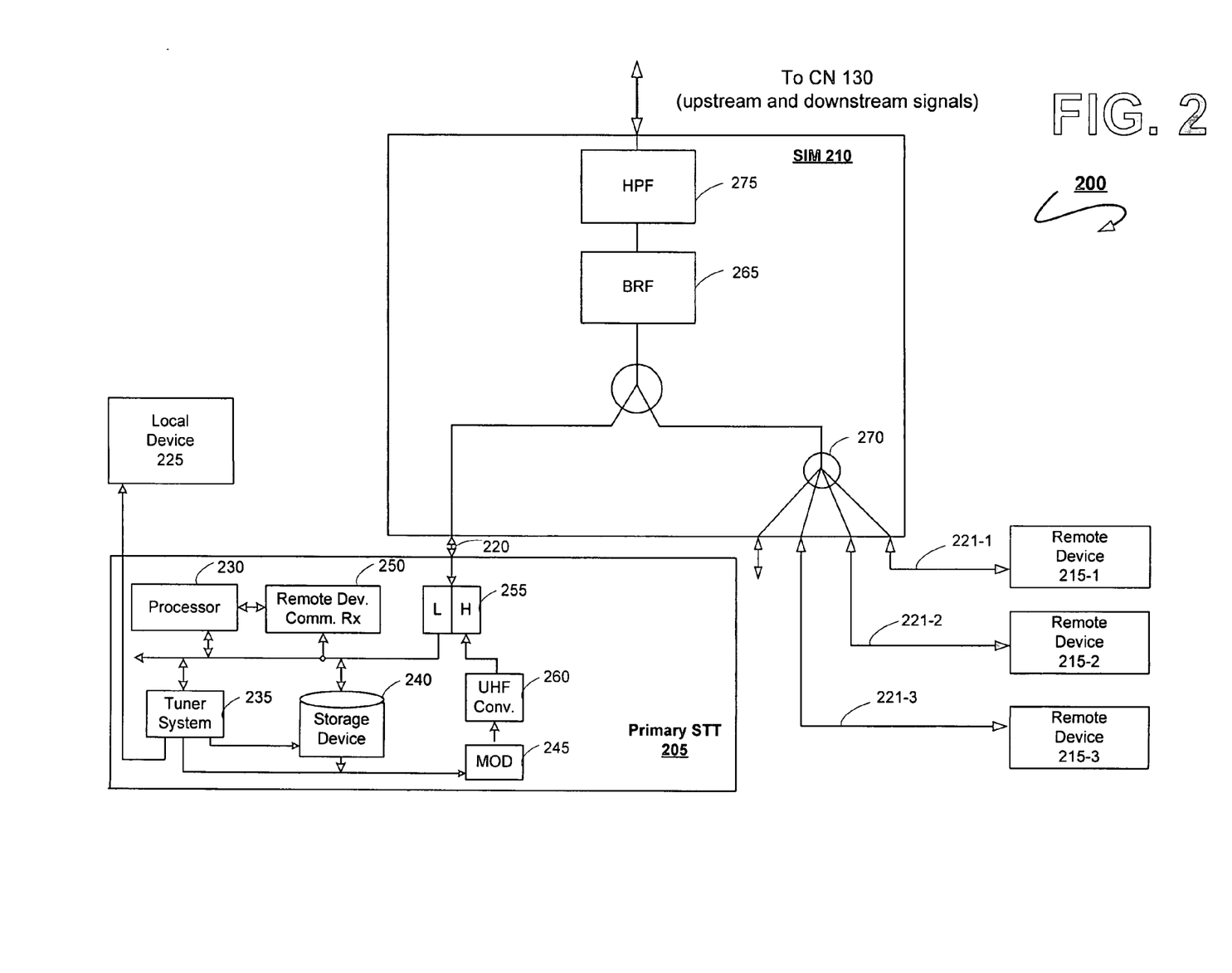
FIG. 2 is a block diagram illustrating one preferred embodiment of a networked multimedia system (NMS) that is suitable for use in the broadband communications system of FIG. 1.

A Preferred Embodiment of the Networked Multimedia System (NMS) Including a Networked Peripheral Device FIG. 2 is a block diagram illustrating one preferred embodiment of the NMS 200 that is suitable for use in the broadband communications system of FIG. 1. The NMS 200 includes a primary STT 205, a splitter/isolator module (SIM) 210, and a plurality of remote devices 215-$n$. Briefly, the SIM 210 receives downstream broadband signals from, for example, a headend or satellite and subsequently provides the downstream signals to the primary STT 205 or to both the primary STT 205 and any one or all of the plurality of remote devices 215-$n$ depending on the implementation. Upon command from at least one of the remote devices 215-$n$, the primary STT 205 may also forward selected real-time downstream signals and/or stored content signals to the requesting remote device(s) 215-$n$ via the SIM 210. More specifically, the plurality of remote devices 215-$n$ communicates with the primary STT 205 by sending reverse control/command signals via coaxial cable 220, 221-$n$ requesting, for example, stored presentations, real-time signals, or an interactive guide. It will be appreciated that other wired mediums, such as telephone lines or data cables, may be used so long as the transport format accommodates the desired transmission medium. Advantageously, in accordance with the present invention, the plurality of remote devices 215-$n$ have access to all of the primary STT's hardware and software functionality, along with receiving downstream signals directly from the headend via the SIM 210. In this manner, the remote devices 215-$n$ may have limited resources, such as not including a storage device or a connected record/playback device, thereby decreasing the overall costs to the service provider and the subscriber while offering advanced services to all of the remote devices that are networked to the primary STT 205.

FIG. 2 also illustrates a simplified, non-limiting block diagram of selected components of the primary STT 205 in accordance with one preferred embodiment of the present invention. In other embodiments, a primary STT 205 may include only some of the components shown in FIG. 2, in addition to other components that are not shown. Importantly, however, the primary STT 205 includes a processor 230, a tuner system 235, a storage device 240, a modulator 245, and a remote device communications receiver 250. In operation, downstream signals (i.e., signals typically ranging from 45 MHz to 850 MHz) are transmitted via the SIM 210 to a low pass filter in diplex filter 255, which provides the downstream signals to the tuner system 235. A plurality of tuners (not shown) included in the tuner system 235 are used to tune to frequency ranges that include content signals indicative of presentations, such as an analog or digital television channel, a PPV event, a VOD presentation, etc. For example, a VOD presentation may, in response to a user request, be received from the headend in the frequency range around 755 MHz, which corresponds to a particular television channel, such as channel 210. The user, therefore, selects the television channel 210 and, in response, a tuner in the tuner system 235 tunes to the frequency range around 755 MHz and extracts the received VOD presentation's content signals. Depending upon the implementation, the tuned VOD presentation is then provided to a viewing display 225 for viewing, the storage device 240 for storing, and/or the modulator 245 for modulating and subsequent transmission to the plurality of remote devices 215-$n$. Additionally, the user may wish to record the presentation using a peripheral device, such as a VCR.

In the event that a remote device 215-$n$, upon user input, requests a presentation from the primary STT 205, a reverse command signal is transmitted from the remote device 215-$n$ to the primary STT 205 via the SIM 210. The remote device command receiver 250 receives and demodulates the command signal according to its transmission method, such as frequency-shift keying (FSK) or on-off keying (OOK) transmission. The processor 230 subsequently receives the demodulated command signals indicative of the requested action (e.g., requesting a presentation) and in accordance therewith instructs the tuner 235 to tune to, for example, a channel carrying a real-time downstream signal, or the processor may retrieve a stored presentation from the storage device 240. The presentation's content signals are then provided to the modulator 245, which modulates the selected presentation prior to forwarding to the SIM 210. A preferred embodiment of the present invention uses a quadrature amplitude modulation (QAM) modulator, which may be used for effectively transmitting signals over coaxial cable in a cable television environment. Other embodiments may include a quadrature phase-shift keying (QPSK) modulator in a satellite environment, an 8VSB (8-vestigial sideband) modulator in a digital terrestrial environment in the U.S., and a COFDM (coded orthogonal frequency division multiplexing) modulator in a digital terrestrial environment in Europe, or alternatively an analog modulator.

The modulated presentation is up-converted to a predetermined higher frequency, which is preferably greater than the highest frequency used in the communications network 130 (FIG. 1), with, for example, a UHF converter 260. In other words, the selected presentation is up-converted to a high frequency channel, such as channel 134, which may have a frequency range from 852 MHz to 858 MHz. It will be appreciated that other frequency ranges can be used, however, so long as the predetermined frequency is within the range that is tunable by the plurality of remote devices 215-$n$. In this example, the service provider would provide downstream signals in the range from 45 MHz to approximately 840 MHz. Accordingly, the up-converted signals at around 855 MHz would not interfere with the downstream signals that are concurrently provided via the common coax 220, 221-$n$ to the primary STT 205 and the remote devices 215-$n$. The up-converted presentation is subsequently provided to the SIM 210 via a high pass filter in the diplex filter 255.

Furthermore, FIG. 2 illustrates a block diagram of a SIM 210 that comprises passive splitter/isolation components in accordance with the present invention. More specifically, a band reject filter (BRF) 265 rejects the frequencies (e.g., from 852 MHz to 858 MHz) of the selected NMS presentation, thereby not allowing the presentation to leave the NMS 200 and enter the communications network 130. It will be appreciated, therefore, that the NMS presentation is reflected off the BRF 265 and routed to a splitter 270 for transmission to the plurality of remote devices 215-$n$. A high pass filter (HPF) 275 is included to ensure that the reverse command signals provided by the plurality of remote devices 215-$n$ are reflected and routed to the primary STT 205 and similarly not transmitted to the communications network 130. It will be appreciated that, if there are significant internal power losses, an amplifier (not shown) can also be included to amplify the downstream signals as necessary.

Figure 3:
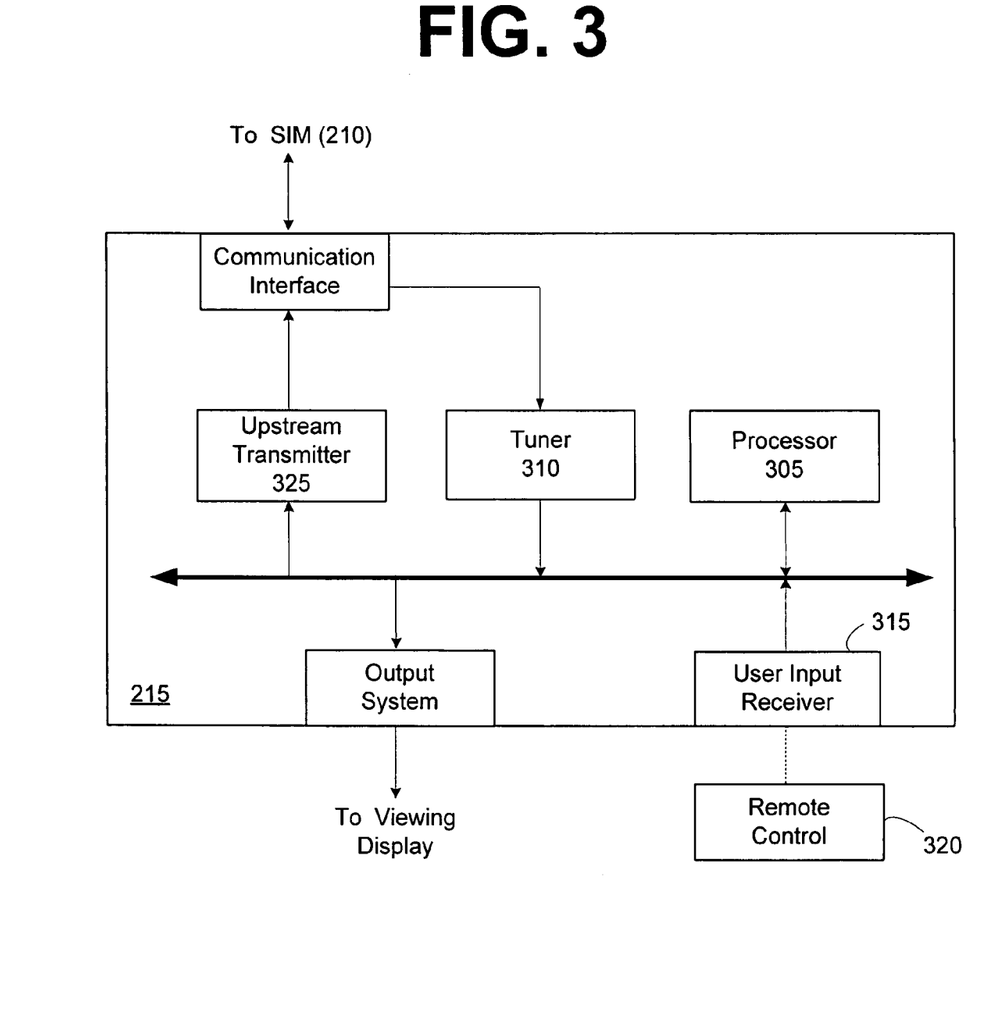
FIG. 3 is a simplified diagram of one preferred embodiment of a remote set-top terminal (STT) device that is suitable for use in the NMS of FIG. 2.

FIG. 3 is a simplified diagram of one preferred embodiment of a remote STT device 215-$n$ that is suitable for use in the NMS of FIG. 2. It will be appreciated that the remote device 215-$n$ may be identical to the primary STT 205 and just share the storage device contents and connected peripherals of the primary STT 205. Alternatively, the remote devices 215-$n$ may be a simplified or conventional version of the primary STT 205. A processor 305 and a tuner system 310, which may be a simplified processor and only one tuner, may be included to extract channels from the received downstream broadband signals. Additionally, decryptors and decoders (not shown) may be included to decode encoded signals for proper processing and display. The remote devices 215-$n$ may also include a user input receiver 315, such as an IR receiver or an RF receiver, that receives signals from a remote control 320, such as an IR remote control or an RF remote control, but is not required.

The reverse command signals, which typically originate from user input commands (e.g., tuned channels, NMS functions such as access to peripheral devices, IPG display, etc.), are transmitted via the coaxial cable 221-$n$ that are routed between the remote devices 215-$n$ and the SIM 210. It will be appreciated that though the coaxial cables 221-$n$ are shown as separate cables, a common coaxial cable can be used tying the remote devices 215-$n$ together so long as the processor 305 of each networked remote device 215-$n$ is configured to understand and reject other remote device's reverse command signals. A preferred embodiment of the present invention processes and transmits the reverse command signals that are indicative of user input commands using frequency shift keying (FSK) and utilizes existing components that are typically included in a conventional remote set-top terminal. More specifically, a QPSK modulator (not shown) is typically included in the upstream transmitter 325 for modulating conventional upstream signals, which are signals typically ranging from 5 MHz to 40 MHz, for transmission to the headend and, in accordance with the present invention, for modulating the reverse command signals, which are signals typically at a frequency around 2.5 MHz, that are routed throughout the NMS 200. Accordingly, the QPSK modulator has an adjustable tuning frequency that modulates the reverse command signals and the upstream signals to a different frequency. In this manner, the reverse command signals do not interfere with conventionally transmitted upstream signals that may be provided by the remote devices 215-$n$. According to the preferred embodiment, the remote device command receiver 250 includes an FSK demodulator for demodulation. It will be appreciated, however, that the reverse command signals may alternatively be transmitted using, for example, on-off keying (OOK) or any other serial data transmissions, and the command receiver 250 can include any demodulator that is in accordance with the reverse command signal transmission used. After demodulation, the command receiver 250 sends signals indicative of the reverse command signal, such as, for example, requesting a recorded programs list, to the processor 230 for processing accordingly.

Figure 4:
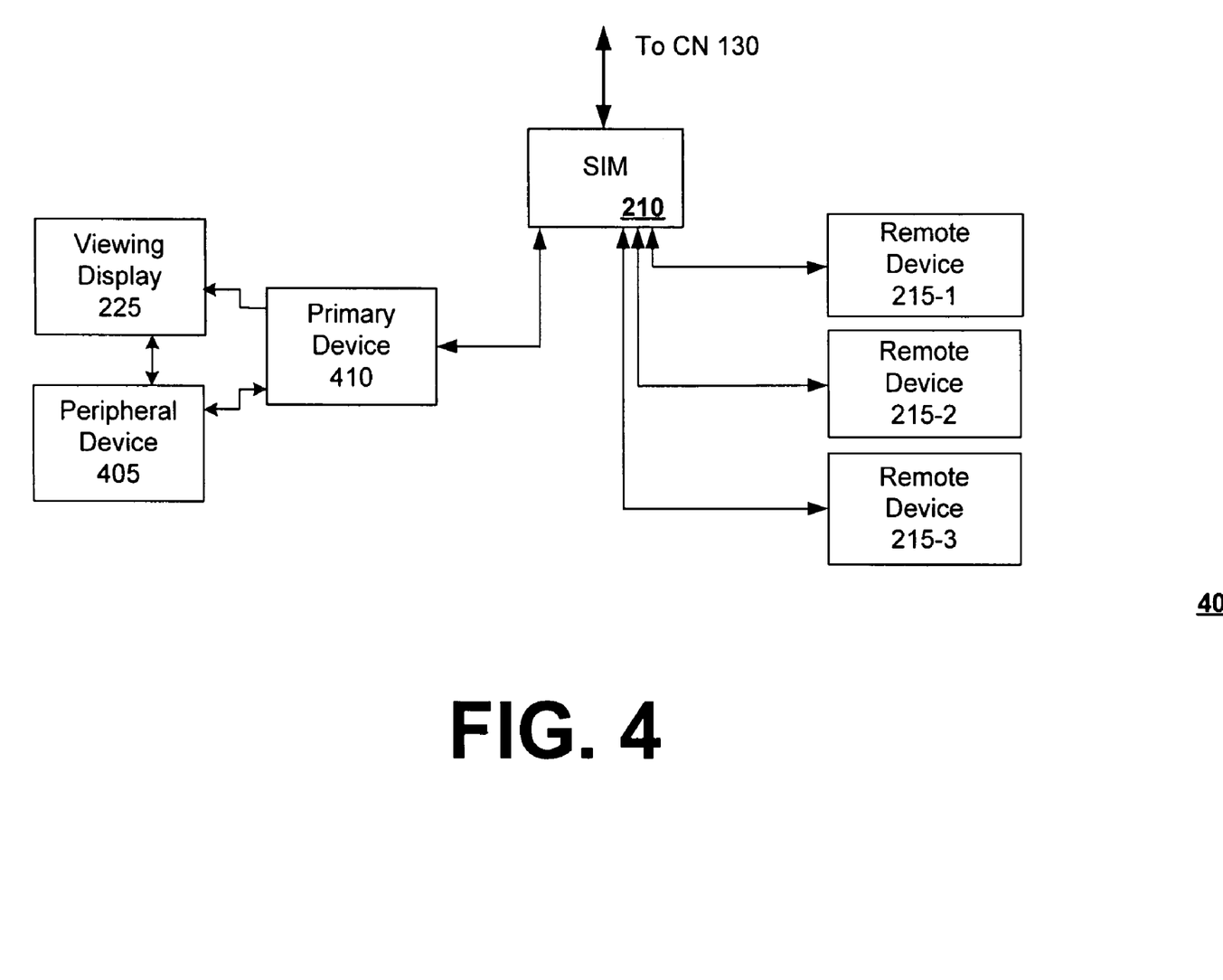
FIG. 4 depicts a networked system, such as shown in FIG. 2, including a networked peripheral device that can be operated from any of the receiving devices.

FIG. 4 depicts a networked system 400 including a networked peripheral device 405 that can be operated from any of the receiving devices 410, 215-$n$ in accordance with the present invention. Preferably, along with the primary device 410, the remote devices 215-$n$ access and operate the peripheral device's functionality and subsequently receive the media presentation from the peripheral device via the primary device 410 and the network 400. More specifically, upon user input, the remote devices 215-$n$ send reverse command signals indicative of control operations, such as selecting a disc that may be included in a high disc capacity DVD player and play, pause, stop, fast-forward, and rewind commands that may operate the peripheral device 405. Additionally, a user may send reverse command signals requesting the peripheral device 405 to record a selected downstream signal that is received at the primary device 410. Alternatively, a user may manually turn on and play the media presentation signals in the peripheral device 405. The primary device 410 can then broadcast the media presentation signals to the plurality of remote devices 215-$n$. Each remote device 215-$n$ simply tunes to the modulated channel and begins receiving and presenting the media presentation signals to a connected viewing display (not shown). Notably, however, except for the physical act of inserting a media presentation, such as a cassette or a disc, into the peripheral device 405, all other commands can be performed by each of the remote devices 215-$n$. In other words, the remote devices 215-$n$ operate the peripheral device 405 as if it were directly connected to each remote device 215-$n$. Furthermore, the remote devices 215-$n$ that are not communicating with or receiving signals from the peripheral device 405 can concurrently receive content signals from the communications network 130 or modulated signals from the primary device 410.

Figure 5:
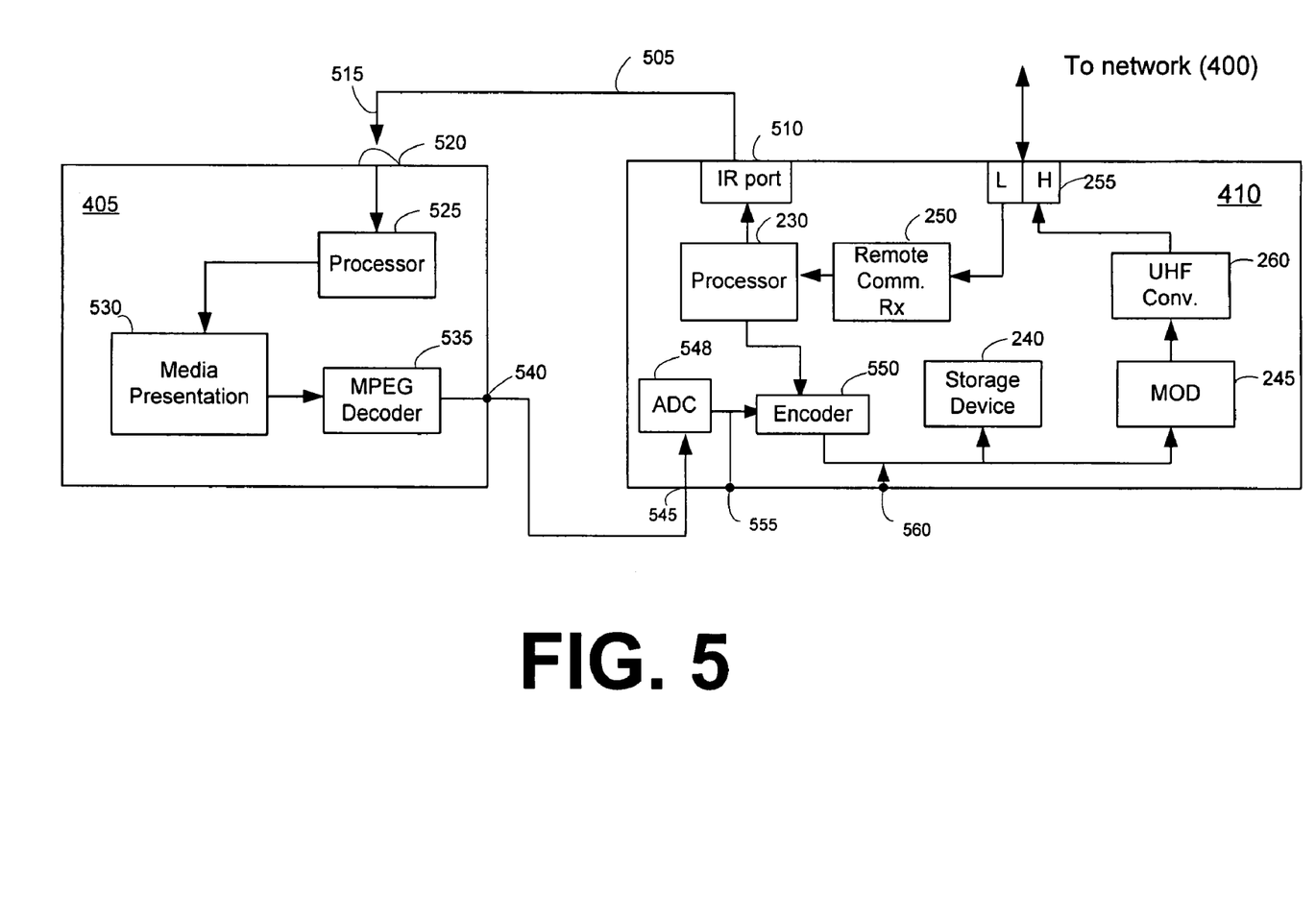
FIG. 5 illustrates a block diagram of the interaction between the primary STT and the peripheral device of FIG. 4.

FIG. 5 illustrates a block diagram of the interaction between the primary device 410 and the peripheral device 405. It will be appreciated that the peripheral device cables, such as power cables, audio/video cables, etc., may be connected to the primary device 410 and the viewing display 225 in a known manner. In the preferred embodiment, an infrared (IR) cable 505 is connected via an IR connector to an IR port 510 on the primary device 410. On the opposite end of the cable 505, an IR emitter 515 is located in close proximity to an IR sensor 520, which is located on the outside of the peripheral device 405. It will be appreciated that the IR sensor 520 is typically included on any consumer electronics device that can be operated by a remote control. Accordingly, IR signals that are indicative of control functions (e.g., play, pause, fast-forward, rewind, record, etc.) are transmitted from the primary device 410 to the peripheral device 405.

Figure 6:
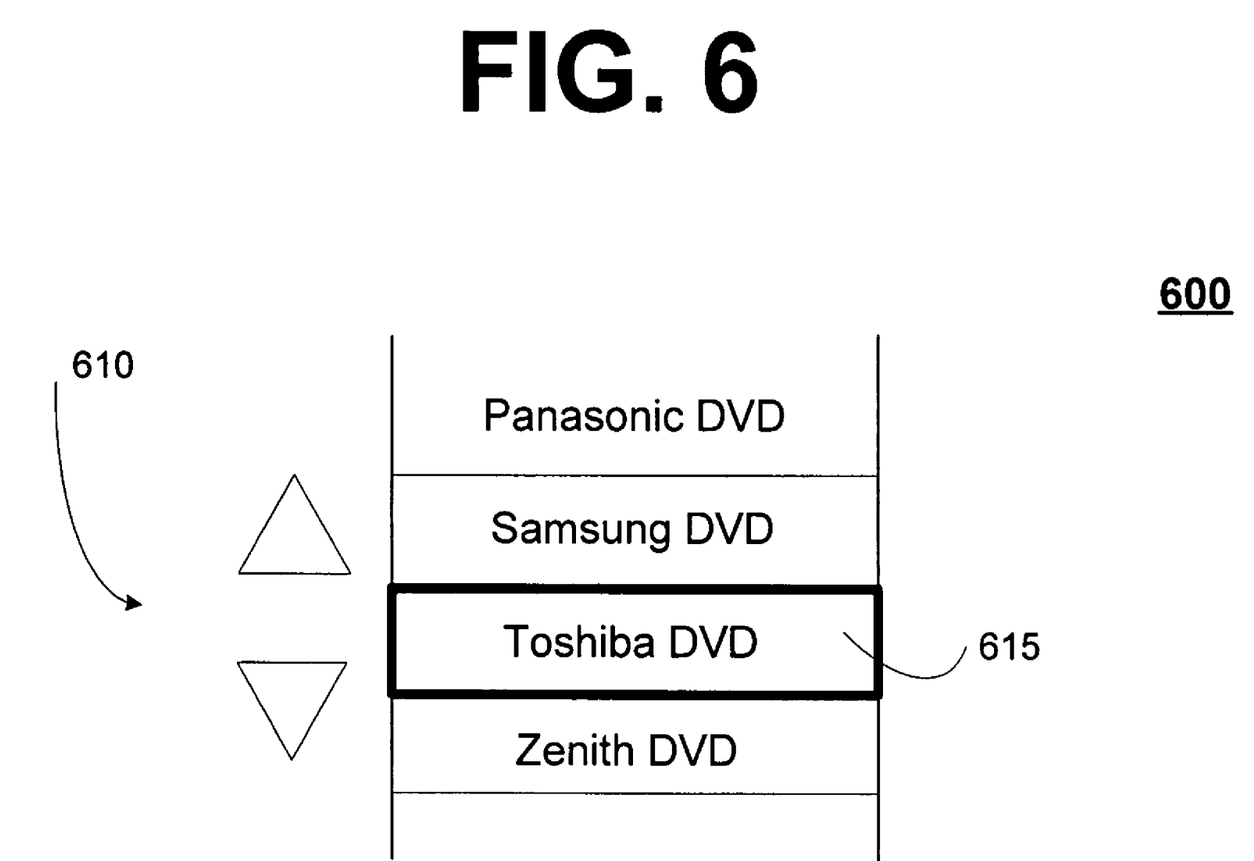
FIG. 6 is an example of a networked peripheral device (NPD) listing that includes, for example, manufacturers and models for a variety of consumer electronics (e.g., VCR, DVD player, MP3 player, etc.).

FIG. 6 is an example of a networked peripheral device (NPD) listing 600 that includes, for example, manufacturers and models for a variety of consumer electronics (e.g., VCR, DVD player, MP3 player, camcorder, etc.). Prior to control of the peripheral device 405, a user selects the coupled peripheral device 405 from the list 600 that is stored in the primary device 410. Once selected, the processor 230 is updated to include the peripheral device's specifications in order to transmit appropriate commands. A preferred embodiment is to access the peripheral device listing 600 by, for example, selecting a "Settings" button on the remote control or a "Settings" menu on the interactive program guide (IPG). The manufacturer and model of the peripheral device 405 is selected from the list 600 of stored models and then saved for future access by the processor 230. By way of example, the user can implement the arrows 610 via the remote control until the correct manufacturer is highlighted. In this case, the user can then select, for example, a Toshiba DVD player 615.

Figure 7:
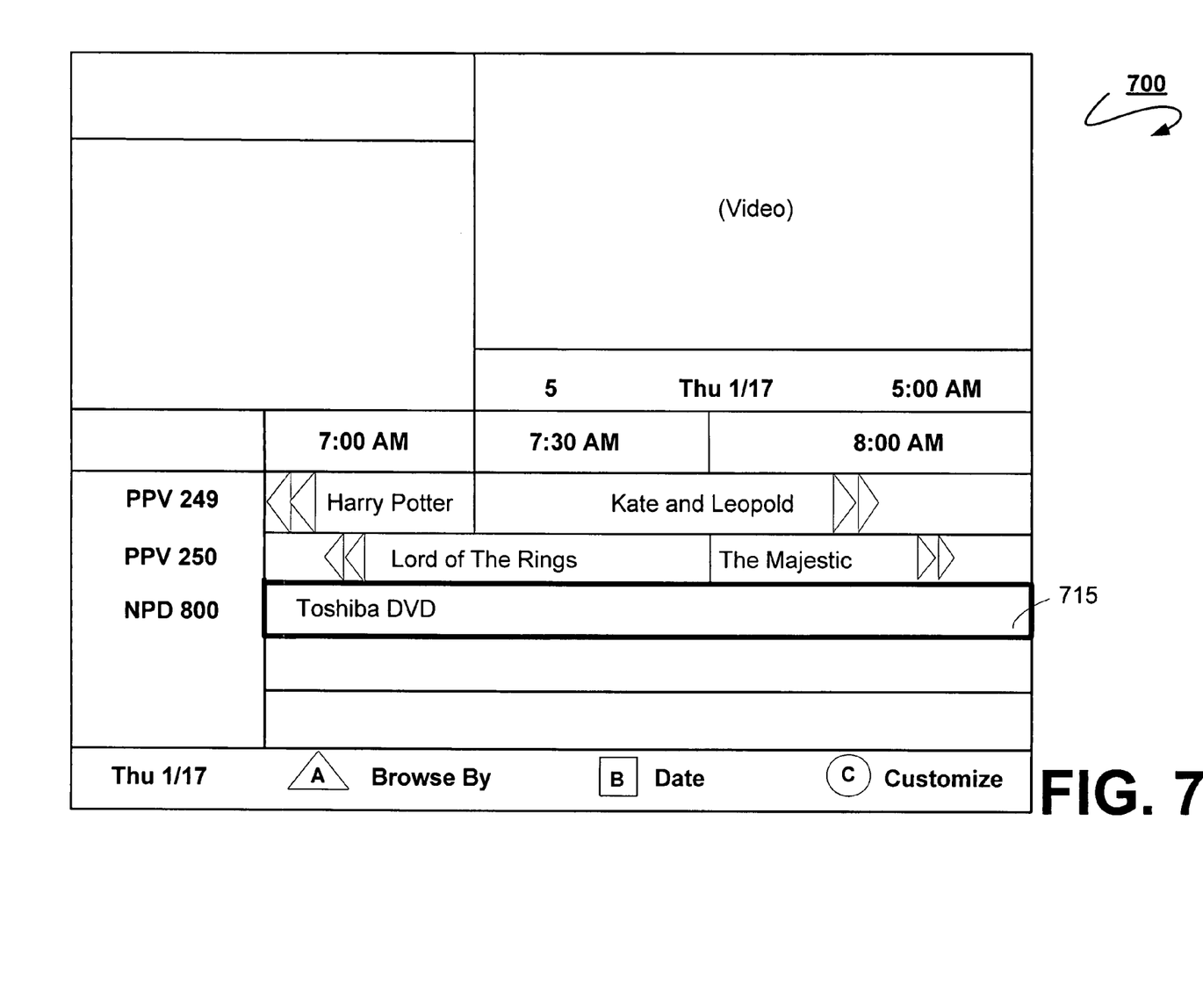
FIG. 7 is an example of an interactive program guide including a channel for the networked peripheral device (NPD) menu (i.e., Toshiba DVD menu).

FIG. 7 is an example of an interactive program guide 700 including a channel for the networked peripheral device (NPD) screen (e.g., Toshiba DVD screen) 715. Notably, the interactive program guide 700 can be updated via the processor 230 to include the selected manufacturer of the peripheral device 405 that can subsequently be accessed by all remote devices 215-$n$. By way of example, in accordance with the present invention, the primary device 410 receives reverse command signals from one or a plurality of remote devices 215-$n$ indicating a request for the IPG 700. From the IPG 700, a user can subsequently select the NPD screen 715 that may display operating commands for the device 405, among other listings associated with the particular peripheral device 405. For example, the screen may also include the title(s) of the cassette or disc, if programmed into the processor 230, that is currently installed or playing in the peripheral device 405.

Figure 8:
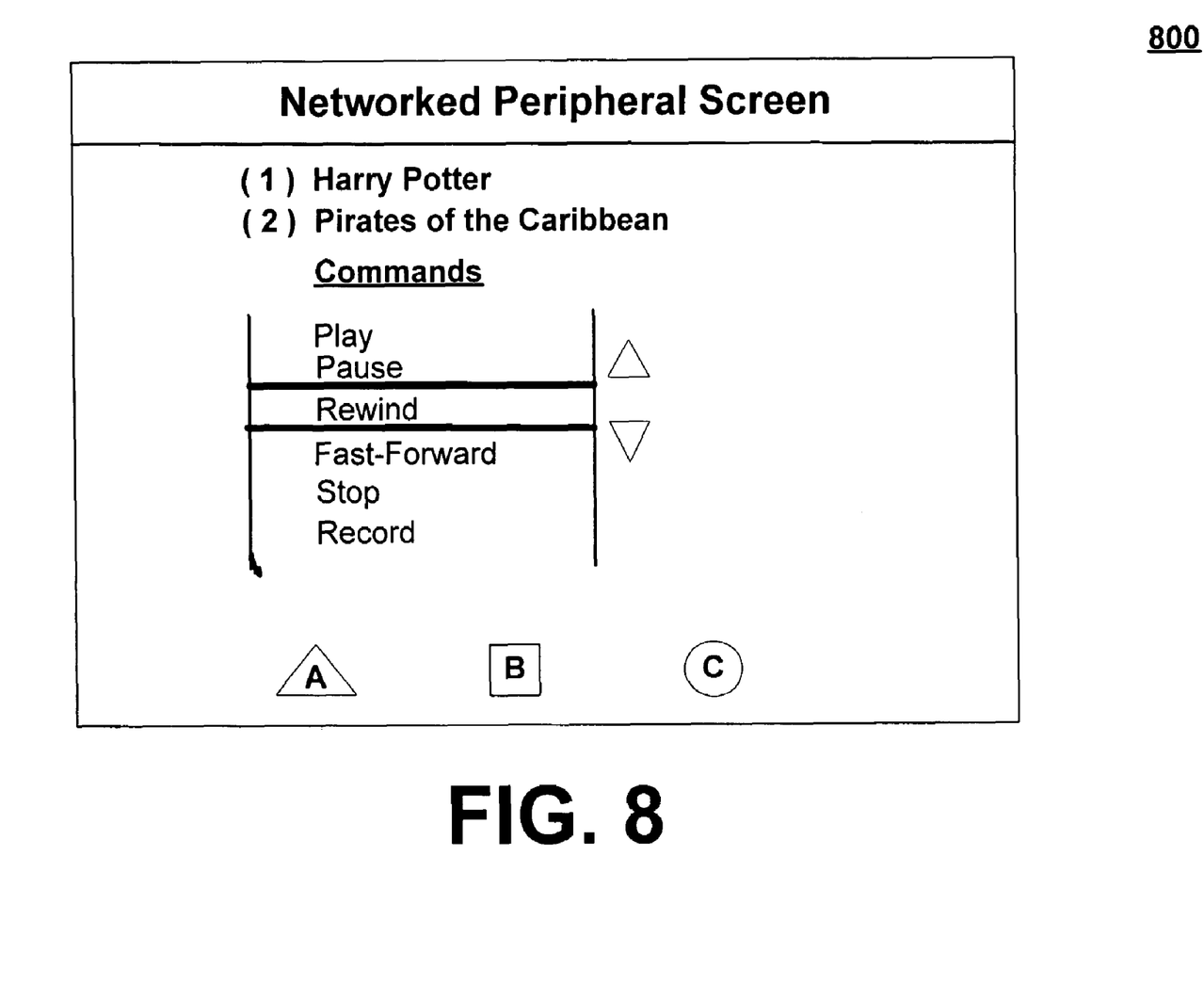
FIG. 8 illustrates an example of the NPD screen that the user may use from any of the receiving devices in order to control the networked peripheral device.

FIG. 8 illustrates an example of the NPD screen 800 that the user may use from any of the receiving devices 410, 215-$n$ in order to control the networked peripheral device 405. From the NPD screen 800, the user may select a disc in the case where there are numerous discs in a DVD player, for example, and choose to play the selected presentation. Furthermore, additional operating options on the screen may include play, pause, fast-forward, stop, etc. Alternatively, the remote control may include buttons representing play, stop, record, etc. In this case, the remote device 215-$n$ can be programmed to accept these operations directly from the remote control and send reverse command signals accordingly. The remote device 215-$n$ sends the selected reverse command signal that is indicative of the operating command to the primary device 410. Subsequently, the remote device command receiver 250 (FIG. 4) and the processor 230 process the signals according to the selection. An appropriate IR signal is then provided from the processor 230 via the IR port 510 to the sensor 520. Further information regarding a multi-room interactive program guide can be found in co-pending U.S. patent application Ser. No. 10/403,485, filed on Mar. 31, 2003, the disclosure and teachings of which are hereby included by reference.

Referring again to FIG. 5, a peripheral processor 525 receives the IR signals indicating the requested command signals and provides operating signals accordingly. A media presentation device 530 receives the operating signals and, for example, reads and transmits the media presentation signals that have been recorded onto a media presentation (e.g., a cassette, disc, or hard-drive). If the media presentation signals have been digitally compressed and stored on, for example, a disc, the digitally compressed signals are typically provided to an MPEG decoder 535. More specifically, in accordance with certain copyrights that have been obtained by, for example, movie producers, the media presentation signals must be decoded to an analog or NTSC (National Television Standards Committee) signal. In this manner, an MPEG decoder 535 decodes the media presentation and provides the analog signals via an output port 540 of the peripheral device 405 to an input port 545 of the primary device 410. Furthermore, when an analog signal is received from the peripheral device 405, an analog to digital converter (ADC) digitizes the analog signal and an encoder 550 (e.g., an MPEG (Moving Pictures Experts Group encoder) subsequently encodes, or digitally compresses, the analog signal for transmission throughout the network system 400.

It is envisioned that the peripheral device 405 can provide signals in any format. For example, the primary device 410 may receive signals in an analog video format (including standard definition and high definition), uncompressed digital video (including DVI, and HDMI), and compressed digital video (MPEG-2 or DV (digital video)), for example. The primary device 410 distinguishes the signal format by the connector that connects the peripheral device 405 with the primary device 410. By way of example, analog signals use a baseband or high-definition input port (e.g., connector 545). A DVI (digital video interface) connector 555 carries uncompressed digital video. Furthermore, a Firewire connector (IEEE 1394) 560 conveys compressed digital video (in either MPEG-2 or DV format). The primary device 410 can, therefore, use the connector type information to determine whether the incoming video needs to be digitized and/or compressed. Additionally, the processor 230 has access to the Firewire connector 360 and understands that the incoming signals are compressed digital signals. Once the signals are available in compressed digital format, the signals are transmitted to the modulator 245 for modulation or the storage device 240 for storage.

Subsequently, the modulator 240 modulates the media presentation signals and the UHF converter 260 converts the signals to a higher frequency. The signals are then provided to the SIM 210 for routing to the remote device 215-*n*. Additionally, the user may wish to store the media presentation signals on the storage device 240. Accordingly, the reverse command signals are processed and the processor 230 instructs the media presentation signals to be routed to the storage device 240. Further information regarding the storage device 240 and routing stored media presentation signals to any one or more remote devices 215-*n* is detailed in copending U.S. patent application Ser. No. 10/342,670 filed on Jan. 15, 2003.

Accordingly, systems and methods have been provided that allow remote devices in a network operate a networked peripheral device. In other words, a user need only purchase one peripheral device that can be used from any device in the network. It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the preferred embodiments of the invention in logic embodied in hardware and/or software-configured mediums.

What is claimed is:

1. A system for providing a shared device in a networked multimedia system, the system comprising:

a primary set top terminal (STT) for receiving a plurality of downstream presentations and reverse command signals, and for providing selected presentation signals; and a plurality of remote STTs coupled to the primary STT via a splitter/isolator module (SIM), wherein the splitter/isolator module (SIM) comprises a splitter configured to facilitate communication with the remote STTs and the primary STT, the SIM being configured to receive the downstream presentations from a communications network and provide the downstream signals to the primary STT, the SIM being further configured to provide at least one selected presentation signal from the primary STT to at least one of the remote STTs in response to receiving a request by the at least one of the remote STTs, wherein the primary STT is further configured to instruct a peripheral device to provide a media presentation for communications to at least one of the remote STTs, wherein the splitter/isolation module (SIM) is further configured to receive, directly from at least one of the plurality of remote STTs, at least one upstream signal, the splitter/isolation module (SIM) being further configured to send the at least one upstream signal received directly from the at least one of the plurality of remote STTs directly to the communications network.

2. The system of claim 1, wherein at least one of the plurality of remote STTs is configured to transmit a reverse command signal requesting the selected presentation signals.

3. The system of claim 2, wherein the reverse command signal is indicative of command operations, and wherein the primary STT is configured to forward the command operations to the peripheral device.

4. The system of claim 3, wherein the command operations comprise one of a record, play, pause, fast-forward, rewind, and stop command.

5. The system of claim 3, wherein the primary STT is coupled to the peripheral device with an infrared (IR) cable and a sensor, wherein the primary STT is configured to convert the command operations into IR signals for transmission via the IR cable to the sensor that is located on the peripheral device.

6. The system of claim 5, wherein at least one of the remote STTs is configured to provide a user option to select one listing from a plurality of listings including manufacturers and models that is indicative of a plurality of peripheral devices, and wherein the one selected listing includes the appropriate IR signals for the peripheral device.

7. The system of claim 6, wherein the primary STT includes an interactive program guide (IPG) that is shared among the primary STT and the plurality of remote STTs, and wherein the IPG is updated to include a channel for the one selected listing that is indicative of a peripheral device screen.

8. The system of claim 7, wherein the peripheral device is configured to generate at least one remote command signal.

9. The system of claim 1, wherein the media presentation includes at least one of the following: an analog signal and a digital signal.

10. The system of claim 9, the primary STT further comprising a processor and an encoder, the processor for instructing the encoder to digitally compress the analog media presentation prior to routing to the remote device requesting media presentation.

11. The system of claim 1, the primary STT further comprising a modulator for modulating the selected presentation signals to a predetermined frequency and for providing modulated signals to at least one remote STT requesting media presentation.

12. The system of claim 1, the primary STT further comprising a storage device for selectively storing presentations from at least one of the plurality of downstream presentations and the media presentation.

13. The system of claim 1, wherein at least one of the following includes a display device: the primary STT and at least one of the remote STTs.

14. A method in a primary STT for communicating signals in a networked multimedia system comprising the steps of:
   receiving at a primary STT a command signal from a remote STT via a splitter/isolation modulate (SIM), the command signal being indicative of a user request for providing at least one media presentation signal from a peripheral device to the remote STT;
   instructing the peripheral device to transmit the requested at least one media presentation signal;
   communicating the at least one media presentation signal to the remote STT via the SIM; and
   displaying the requested at least one media presentation signal on a display coupled to the remote STT,
   wherein the SIM is configured to receive, directly from the primary STT and the remote STT, at least one upstream signal, the SIM being further configured to send the at least one upstream signal directly to the communications network.

15. The method of claim 14, further comprising digitally compressing at least one of the media presentations prior to communicating at least one of the media presentation signals to the remote STT via the SIM.

16. The method of claim 14, further comprising modulating at least one of the media presentation signals at a predetermined frequency.

17. The method of claim 14, wherein the command signal is a play command.

18. The method of claim 17, further comprising the step of receiving a second command signal that is indicative of at least one of the following: a pause command, a rewind command, a fast-forward command, a stop command, and a record command.

19. The method of claim 14, further comprising the step of receiving a second user input signal that is indicative of a record command for recording a selected one of at least one of first media presentation signal.

20. The method of claim 14, wherein the command signal is filtered to prevent transmission to an external recipient.

21. The method of claim 14, wherein at least one of the following includes a display device: the primary STT and at least one of the remote STTs.

* * * * *